(12) United States Patent  (10) Patent No.: US 9,376,025 B2
Kim et al.  (45) Date of Patent: Jun. 28, 2016

(54) CHARGING APPARATUS AND ELECTRIC VEHICLE INCLUDING THE SAME

(71) Applicant: LG Electronics Inc., Seoul (KR)

(72) Inventors: Jungbum Kim, Seoul (KR); Anyeol Jung, Seoul (KR); Junyoung Lim, Seoul (KR); Youngjin Kim, Seoul (KR); Dongyup Lee, Seoul (KR); Murat Senol, Seoul (KR); Rik De Doncker, Leuven (BE)

(73) Assignee: LG Electronics Inc., Seoul (KR)

( * ) Notice: Subject to any disclaimer, the term of this patent is extended or adjusted under 35 U.S.C. 154(b) by 54 days.

(21) Appl. No.: 14/173,519

(22) Filed: Feb. 5, 2014

(65) Prior Publication Data

US 2014/0217974 A1 Aug. 7, 2014

(30) Foreign Application Priority Data

Feb. 6, 2013 (KR) .................. 10-2013-0013517
Feb. 6, 2013 (KR) .................. 10-2013-0013519

(51) Int. Cl.
*B60L 11/18* (2006.01)
(52) U.S. Cl.
CPC ......... *B60L 11/1811* (2013.01); *B60L 11/1812* (2013.01); *Y02T 10/7005* (2013.01); *Y02T 10/7072* (2013.01); *Y02T 90/127* (2013.01); *Y02T 90/14* (2013.01)
(58) Field of Classification Search
CPC .......................... B60L 11/1811; B60L 11/1812
USPC ........................................................ 320/109
See application file for complete search history.

(56) References Cited

U.S. PATENT DOCUMENTS 7,795,844 B2 * 9/2010 Ichikawa ............ H01M 10/613
320/134
7,891,451 B2 2/2011 Oyobe
8,478,469 B2 * 7/2013 Ueo ........................ B60L 3/003
701/22
(Continued)

FOREIGN PATENT DOCUMENTS

CN 101454958 A 6/2009
JP 2009-065808 A 3/2009
(Continued)

OTHER PUBLICATIONS

Korean Office Action dated Apr. 16, 2015 for Korean Application No. 10-2013-0013519, 8 pages.
(Continued)

*Primary Examiner* — Sun Lin
(74) *Attorney, Agent, or Firm* — Fish & Richardson P.C.

(57) ABSTRACT

A charging apparatus and an electric vehicle including the same are disclosed. The charging apparatus includes a converter for, in a charging mode, converting an input alternating current (AC) voltage into a direct current (DC) voltage, and a controller for controlling the converter. The converter includes a motor, and a switching unit for supplying the input AC voltage to the motor by performing a switching operation. The converter also includes an inverter for, in a motor operation mode, converting a DC voltage from a battery into an AC voltage by performing a switching operation of three-phase switching elements and driving the motor. In the charging mode, the inverter operates switching elements of at least one phase of the three-phase switching elements and converts the voltage received from the motor into a predetermined DC voltage.

20 Claims, 11 Drawing Sheets

(56) References Cited

U.S. PATENT DOCUMENTS

| | | | |
|---|---|---|---|
| 8,558,492 B2 | 10/2013 | Oh | |
| 8,736,101 B2 * | 5/2014 | Masuda | B60L 11/005 307/10.1 |
| 8,810,060 B2 * | 8/2014 | Kamaga | B60K 6/445 307/10.1 |
| 8,872,473 B2 * | 10/2014 | Song | B60L 7/14 320/109 |
| 8,901,882 B2 * | 12/2014 | Song | B60L 11/1814 320/109 |
| 2009/0079389 A1 | 3/2009 | Ohtomo | |
| 2011/0279083 A1 | 11/2011 | Asai | |
| 2012/0038319 A1 | 2/2012 | Sekido | |
| 2012/0086267 A1 | 4/2012 | Ichikawa | |
| 2012/0256589 A1 | 10/2012 | Ichikawa | |
| 2013/0193923 A1 | 8/2013 | Kimura | |
| 2014/0021918 A1 | 1/2014 | Ichikawa | |
| 2014/0197789 A1 | 7/2014 | Ono | |
| 2014/0217973 A1 * | 8/2014 | Lee | B60L 11/1812 320/109 |
| 2014/0253034 A1 | 9/2014 | Kurimoto | |
| 2015/0175026 A1 | 6/2015 | Uyeki | |

FOREIGN PATENT DOCUMENTS

| | | |
|---|---|---|
| KR | 10-2011-0053090 A | 5/2011 |
| KR | 10-2012-0106457 A | 9/2012 |
| KR | 10-2012-0125886 A | 11/2012 |

OTHER PUBLICATIONS

Korean Office Action dated Jun. 23, 2015 for Korean Application No. 10-2013-0013517, 5 pages.

Chinese Office Action dated Sep. 25, 2015, for Chinese Application No. 201410045303.5, 4 pages.

* cited by examiner $S_1$ and $S_a^1$ are ON
(a)

$S_1$ is ON, $S_a^1$ OFF
(b)

S₁ is ON, Sₐ OFF
(a)

S₁ and Sₐ are OFF
(b)

$S_1$ and $S_a^1$ are ON
(a)

$S_1$ is ON, $S_a^1$ OFF
(b)

$S_1$ is ON, $S_a$ OFF
(a)

$S_1$ and $S_a$ are OFF
(b)

CHARGING APPARATUS AND ELECTRIC VEHICLE INCLUDING THE SAME

CROSS-REFERENCE TO RELATED APPLICATION

This application claims the priority benefit of Korean Patent Application Nos. 10-2013-0013517 and 10-2013-0013519, filed on Feb. 6, 2013, in the Korean Intellectual Property Office, the disclosure of the prior applications is incorporated herein by reference.

FIELD

The present disclosure relates to a charging apparatus and an electric vehicle including the same.

BACKGROUND

A vehicle with an internal combustion engine may lead to environmental pollution or exhaustion of energy due to consumption of energy. Instead of a vehicle using solely an internal combustion engine as a power source, an electric vehicle using electricity as a power source and a hybrid vehicle using an internal combustion engine and electricity have been developed.

Such an electric vehicle or hybrid vehicle generates output using a motor and a battery and various attempts have been made to improve output and mileage.

SUMMARY

In one aspect, a charging apparatus includes a converter configured to, in a charging mode, receive an input alternating current (AC) voltage and convert the input AC voltage into an output direct current (DC) voltage and a controller configured to control the converter. The converter includes a motor and a switching unit configured to selectively supply the input AC voltage to the motor by performing a switching operation. The converter also includes an inverter configured to, in a motor operation mode, convert a battery DC voltage from a battery into an output AC voltage by performing a switching operation of three-phase switching elements and drive the motor. In the charging mode, the inverter is configured to operate switching elements of at least one phase of the three-phase switching elements and convert voltage received from the motor into a predetermined DC voltage and supply the predetermined DC voltage to the battery.

Implementations may include one or more of the following features. For example, in the charging mode, a switching element of the switching unit, the motor, and the switching elements of one phase of the inverter operate in a buck mode or a boost mode.

In some implementations, when a lower-arm switching element of the switching elements of one phase of the inverter is turned on and then turned off in a state in which a switching element of the switching unit is turned on, the switching element of the switching unit, the motor, and the switching elements of one phase of the inverter operate in a boost mode. In these implementations, when the switching element of the switching unit is turned on and then turned off in a state in which the lower-arm switching element of the switching elements of one phase of the inverter is turned off, the switching element of the switching unit, the motor, and the switching elements of one phase of the inverter operate in a buck mode.

In addition, the inverter, the controller, and the switching unit are located on the same circuit board. Further, in the charging mode, a switching element of the switching unit, the motor, and the switching elements of two phases of the inverter may operate in a buck mode or a boost mode.

In some examples, the controller may be configured to, in the charging mode, control the switching elements of one phase of the three-phase switching elements of the inverter such that a rotator of the motor is aligned with a predetermined location, and control output of a switching control signal to the switching elements of one phase of the three-phase switching elements of the inverter such that a torque command component of a current command component is zero. In these examples, the controller may be configured to, in the charging mode, sense the location of the rotator of the motor and control the switching elements of a nearest phase of the three-phase switching elements of the inverter such that the rotator is located in correspondence with the nearest phase of the three phases of a stator of the motor.

In some implementations, the controller may include a speed calculator configured to calculate rotator speed information of the motor based on a location signal of a rotator of the motor or detected current flowing in the motor and a current command generator configured to generate a current command value based on the speed information and a speed command value. In these implementations, the controller may include a voltage command generator for generating a voltage command value based on the current command value and the detected current and a switching control signal output unit configured to output a switching control signal that drives the inverter based on the voltage command value.

In some examples, when a lower-arm switching element of the switching elements of two phases of the inverter is turned on and then turned off in a state in which a switching element of the switching unit is turned on, the switching element of the switching unit, the motor, and the switching elements of two phases of the inverter may operate in a boost mode. In these examples, when the switching element of the switching unit is turned on and then turned off in a state in which the lower-arm switching element of the switching elements of two phases of the inverter is turned off, the switching element of the switching unit, the motor, and the switching elements of two phases of the inverter may operate in a buck mode.

Also, the controller may be configured to, in the charging mode, control the operation of the switching elements of two phases of the three-phase switching elements of the inverter in correspondence with a location of a rotator of the motor. Further, the controller may be configured to, in the charging mode, control the switching elements of two phases of the three-phase switching elements of the inverter such that a rotator of the motor is aligned with a predetermined location and control output of a switching control signal to the switching elements of two phases of the three-phase switching elements of the inverter such that a torque command component of a current command component is zero.

In addition, the controller may be configured to, in the charging mode, sense a location of a rotator of the motor and control the switching elements of two phases of the three-phase switching elements of the inverter such that the location of the rotator is maintained. And, the controller may be configured to, in the charging mode, control the switching elements of two phases of the three-phase switching elements of the inverter such that a rotator of the motor is aligned with a predetermined location and control matching of a sum of current vectors applied to two phases of a stator of the motor and a direction of a flux vector of the rotator of the motor.

In another aspect, an electric vehicle includes a battery and a charging apparatus including a converter configured to, in a charging mode, receive an input alternating current (AC)

voltage and convert the input AC voltage into a direct current (DC) voltage and a controller configured to control the converter. The converter includes a motor and a switching unit configured to selectively supply the input AC voltage to the motor by performing a switching operation. The converter also includes an inverter configured to, in a motor operation mode, convert a battery DC voltage from a battery into an output AC voltage by performing a switching operation of three-phase switching elements and drive the motor. In the charging mode, the inverter is configured to operate switching elements of at least one phase of the three-phase switching elements and convert voltage received from the motor into a predetermined DC voltage and supply the predetermined DC voltage to the battery.

Implementations may include one or more of the following features. For example, when a lower-arm switching element of the switching elements of one phase of the inverter is turned on and then turned off in a state in which a switching element of the switching unit is turned on, the switching element of the switching unit, the motor, and the switching elements of one phase of the inverter operate in a boost mode. In this examples, when the switching element of the switching unit is turned on and then turned off in a state in which the lower-arm switching element of the switching elements of one phase of the inverter is turned off, the switching element of the switching unit, the motor, and the switching elements of one phase of the inverter operate in a buck mode.

In addition, the controller may be configured to, in the charging mode, control the switching elements of one phase of the three-phase switching elements of the inverter such that a rotator of the motor is aligned with a predetermined location and control output of a switching control signal to the switching elements of one phase of the three-phase switching elements of the inverter such that a torque command component of a current command component is zero. Further, the controller may be configured to, in the charging mode, control the switching elements of two phases of the three-phase switching elements of the inverter such that a rotator of the motor is aligned with a predetermined location and control output of a switching control signal to the switching elements of two phases of the three-phase switching elements of the inverter such that a torque command component of a current command component is zero.

In some implementations, when a lower-arm switching element of the switching elements of two phases of the inverter is turned on and then turned off in a state in which a switching element of the switching unit is turned on, the switching element of the switching unit, the motor, and the switching elements of two phases of the inverter may operate in a boost mode. In these implementations, when the switching element of the switching unit is turned on and then turned off in a state in which the lower-arm switching element of the switching elements of two phases of the inverter is turned off, the switching element of the switching unit, the motor, and the switching elements of two phases of the inverter may operate in a buck mode.

Also, the controller may be configured to, in the charging mode, sense a location of a rotator of the motor and control the switching elements of two phases of the three-phase switching elements of the inverter such that the location of the rotator is maintained. Further, the controller may be configured to, in the charging mode, control the switching elements of two phases of the three-phase switching elements of the inverter such that a rotator of the motor is aligned with a predetermined location and control matching of a sum of current vectors applied to two phases of a stator of the motor and a direction of a flux vector of the rotator of the motor.

DETAILED DESCRIPTION

Figure 1:
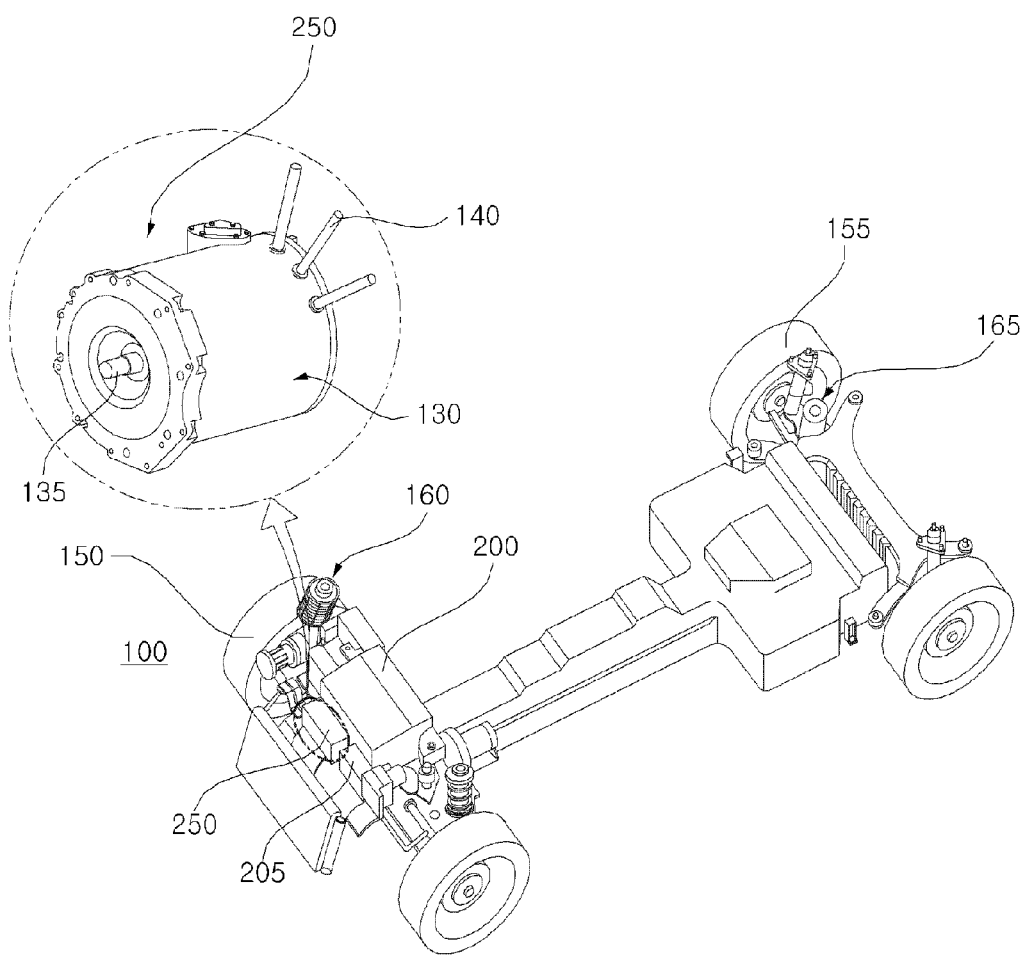
FIG. 1 is a schematic diagram showing an example of the body of an example electric vehicle.

FIG. 1 illustrates an example body of an example electric vehicle.

Referring to FIG. 1, the electric vehicle 100 may include a battery 205 for supplying a voltage, and a motor driving unit 200 for receiving a voltage from the battery 205 and driving a motor 250. The motor 250 is rotated by the motor driving unit 200. Front wheels 150 and rear wheels 155 are rotated by the motor 250, and front-wheel and rear-wheel suspensions 160 and 165 reduce (e.g., prevent) vibrations of the road from being delivered to the vehicle body. The electric vehicle may further include a driving gear for changing the rotation speed of the motor 250 according to a gear ratio.

The battery 205 supplies a voltage to the motor driving unit 200. In particular, the battery supplies a direct current (DC) voltage to a capacitor C of the motor driving unit 200.

The battery 205 may be formed of a set of a plurality of unit cells. The plurality of unit cells may be managed by a battery management system (BMS) in order to maintain a constant voltage. That is, the plurality of unit cells may output a constant voltage by the BMS.

For example, the BMS may detect a voltage $V_{bat}$ of the battery 205 and send the voltage $V_{bat}$ to an electronic controller, such as a controller 430 (see FIG. 2) of the motor driving unit 200. When the voltage $V_{bat}$ of the battery is decreased to a lower limit value or less, the BMS may supply the DC voltage stored in the capacitor C of the motor driving unit 200 to the battery. In addition, when the voltage $V_{bat}$ of the battery is increased to an upper limit value or more, the BMS may supply a DC voltage to the capacitor C of the motor driving unit 200.

The battery 205 may be composed of a secondary battery for charging or discharging. Other arrangements also are possible.

The motor driving unit 200 receives a DC voltage from the battery 205 via a power input cable in a motor operation mode. The motor driving unit 200 converts the DC voltage received from the battery 205 into an alternating current (AC) voltage and supplies the AC voltage to the motor 250. The converted AC voltage may be a three-phase AC voltage.

The motor driving unit 200 supplies the three-phase AC voltage to the motor 250 via a three-phase output cable included in the motor driving unit 200 in the motor operation mode. Although the motor driving unit 200 may have a three-phase output cable composed of three cables, three cables may be included in a single cable.

The motor driving unit 200 may receive an input AC voltage, convert the input AC voltage into a DC voltage, and supply the DC voltage to the battery 205, in a charging mode. Thus, the motor driving unit 200 may be referred to as a charging apparatus.

In the present specification, the motor driving unit 200 and the charging apparatus are used interchangeably and have the same meaning.

The motor 250 includes a stator 130 and a rotator 135. The motor 250 includes an input cable 140 and receives an AC voltage from the motor driving unit 200. The motor 250 may be a three-phase motor, for example. When a variable voltage/variable frequency AC voltage of each phase is applied to a coil of the stator of each phase, the rotation speed of the rotator is changed according to applied frequency.

The motor 250 may include various motors such as an induction motor, a blushless DC motor (BLDC), a reluctance motor, etc.

The driving gear may be provided on one side of the motor 250. The driving gear converts rotation energy of the motor 250 according to gear ratio. The rotation energy output from the driving gear is delivered to the front wheels 150 and/or the rear wheels 155 to move the electric vehicle 100.

The front-wheel suspension 160 and the rear-wheel suspension 165 support the front wheels 150 and the rear wheels 155, respectively. The front-wheel suspension 160 and the rear-wheel suspension 165 support the wheels by a spring or a damper in a vertical direction such that vibrations of the road do not reach the vehicle body.

The front wheels 150 may include a steering apparatus. The steering apparatus steers the front wheels 150 such that a driver steers the electric vehicle 100 in a desired direction.

In some implementations, the electric vehicle 100 may include an electronic controller for controlling electronic apparatuses included in the electric vehicle. The electronic controller controls operation and display of each apparatus. In addition, the electronic controller may control the BMS.

The electronic controller may generate a driving command value according to various driving modes (forward mode, backward mode, neutral mode and parking mode), based on sensed signals from an inclination angle sensor for sensing an inclination angle of the electric vehicle 100, a speed sensor for sensing the speed of the electric vehicle 100, a brake sensor for sensing operation of a brake pedal and an accelerator sensor for sensing operation of an accelerator pedal. The driving command value may be a torque command value or a speed command value, for example.

The electric vehicle 100 may include an electric vehicle using a battery and a motor and a hybrid electric vehicle using a battery and a motor while using an engine. The hybrid electric vehicle may further include a switch for selecting any one of the battery and the engine and a transmission. A method for driving the hybrid electric vehicle may be divided into a serial method for converting mechanical energy output from the engine into electric energy to drive the motor and a parallel method for simultaneously utilizing mechanical energy output from the engine and electric energy of the battery.

The motor driving unit 200 will be described below with reference to FIG. 2 and subsequent figures thereof.

Figure 2:
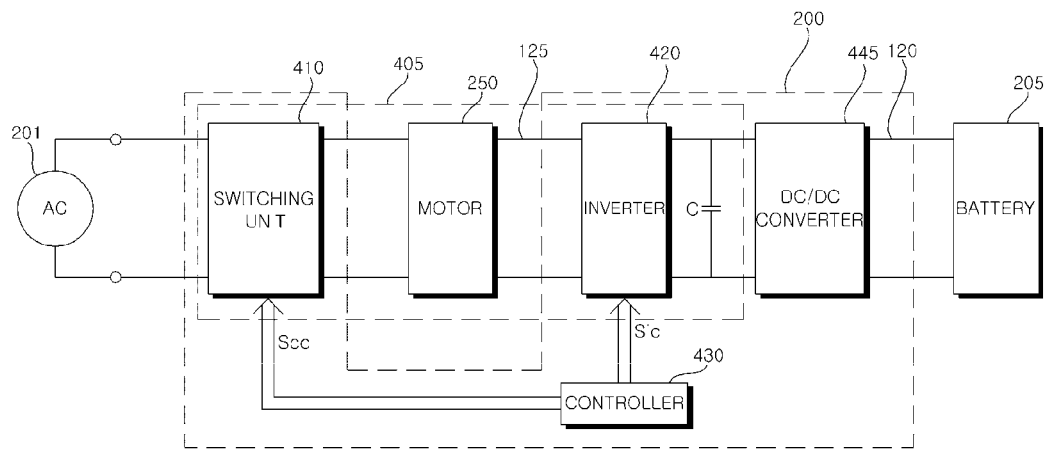
FIG. 2 is a block diagram showing an example of the internal configuration of a driving unit of FIG. 1.
Figure 3:
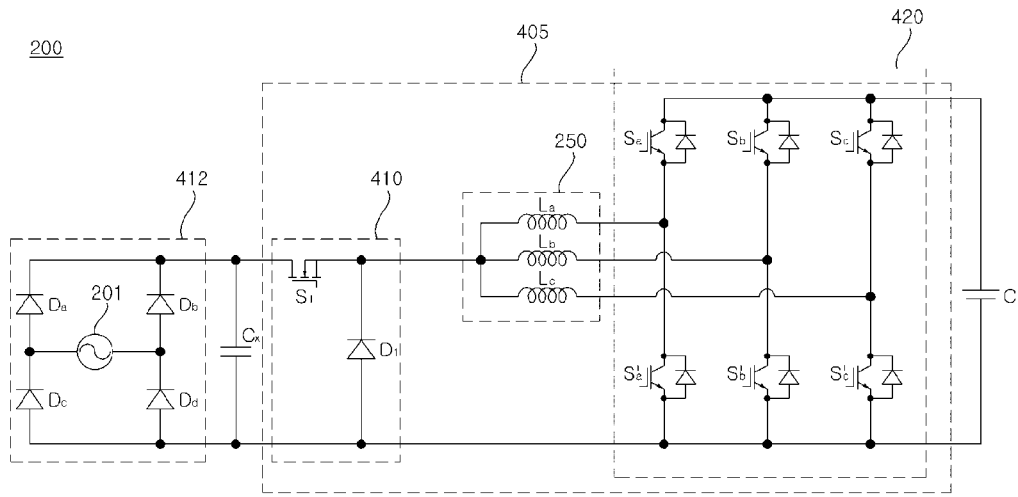
FIG. 3 is a circuit diagram of an example of the driving unit of FIG. 2.

FIG. 2 shows an example of the internal configuration of the driving unit of FIG. 1, and FIG. 3 illustrates example circuitry of the driving unit of FIG. 2.

The motor driving unit 200, that is, the charging apparatus 200, may include a converter 405 and a controller 430. The converter 405 may include a switching unit 410, a motor 250, an inverter 420 and/a DC/DC converter 445. Here, the DC/DC converter 445 may be selectively included.

The switching unit 410 is provided at a front stage of the motor 250 and includes a switching element $S_1$ to supply a voltage from an input AC power source 201 to the motor 250 by a switching operation of the switching element.

Although the input AC power source 201 is a single-phase AC power source in FIG. 2, the input AC power source may be a three-phase AC power source.

A rectifier (412 of FIG. 3) for rectifying the voltage from the input AC power source 201 may be further provided at a front stage of the switching unit 410.

In FIG. 3, as the rectifier 412 of the single-phase AC voltage, four diodes $D_a$, $D_b$, $D_c$ and $D_d$ are used in the form of a bridge.

The switching unit 410 may include a switching element $S_1$ for switching the voltage output from the rectifier 412 and delivering the voltage to the motor 250 and a diode $D_1$ provided between the switching element $S_1$ and the motor 250. A capacitor $C_x$ for smoothing the rectified voltage may be further provided between the switching unit 410 and the rectifier 412.

The switching unit 410 may operate as a buck converter along with the motor 250. A general buck converter includes an inductor. However, in some implementations, the switching unit 410 does not include an inductor and uses a coil wound on the stator 130 of the motor 250 as an inductor.

FIG. 3 shows an example of an equivalent circuit of the motor 250. The three-phase motor 250 may be electrically expressed by an a-phase inductor $L_a$, a b-phase inductor $L_b$ and a c-phase inductor $L_c$.

In some examples, the switching unit 410 operates as a buck converter.

The switching element $S_1$ of the switching unit 410 may be controlled by a switching control signal $S_{cc}$ of the controller 430.

An input current detector may be provided between the rectifier 412 and the input AC power source 201. In addition, an input voltage detector may be provided across a capacitor $C_x$ of the switching unit 410.

The input current detector may detect input AC current received from the input AC power source 201. As the input current detector, a current transformer (CT), a shunt resistor, etc. may be used. The detected input AC current may be input to the controller 430 as a discrete signal having a pulse shape.

The input voltage detector may detect a voltage across the capacitor C. The input voltage detector may include a resistor, an amplifier, etc. The detected input voltage may be input to the controller 430 as a discrete signal having a pulse shape.

The inverter 420 includes a plurality of inverter switching elements, which may convert a DC voltage $V_{dc}$ smoothed by an on/off operation of the switching elements into three-phase AC voltages $v_a$, $v_b$ and $v_c$ having a predetermined frequency and output the three-phase AC voltages to the three-phase synchronization motor 250.

In the inverter 420, upper-arm switching elements $S'_a$, $S'_b$ and $S'_c$ and lower-arm switching elements $S'_a$, $S'_b$ and $S'_c$ are connected in series to define respective pairs and a total of three pairs of upper-arm and lower-arm switching elements $S_a\&S'_a$, $S_b\&S'_b$ and $S_c\&S'_c$ are connected in parallel. The switching elements $S_a$, $S'_a$, $S_b$, $S'_b$, $S_c$ and $S'_c$ are connected with diodes in inverse parallel.

The switching elements of the inverter 420 perform the on/off operation based on an inverter switching control signal $S_{ic}$ from the controller 430.

The inverter 420 converts the DC voltage from the battery to the AC voltage and drives the motor 250 in the operation mode of the motor 250.

In the inverter 420, one-phase switching elements among the three-phase switching elements of the inverter 420 operate in a charging mode. That is, any one pair of upper-arm and lower-arm switching elements among the three pairs of upper-arm and lower-arm switching elements may operate in the charging mode.

Accordingly, in the charging mode, the voltage from the input AC power source 201 may be converted into the DC voltage via the switching unit 410, the motor 250 and the inverter 420 and may be supplied to the battery 205, which will be described in more detail below with reference to FIG. 4 and the subsequent figures.

The controller 430 may control the operation of the switching elements of the inverter 420. The controller 430 may receive output current detected by the output current detector (E of FIG. 8).

The controller 430 outputs the inverter switching control signal $S_{ic}$ to the inverter 420 in order to control the switching operation of the inverter 420. The inverter switching control signal $S_{ic}$ is a pulse width modulation (PWM) switching control signal and is generated and output based on the output current value detected by the output current detector E.

The controller 430 may control the switching operation of the switching element $S_1$ of the switching unit 410. The controller 430 may receive input current detected by the input current detector. The controller 430 may output the converter switching control signal $S_{cc}$ to the switching unit 410 in order to control the switching operation of the switching unit 410. The converter switching control signal $S_{cc}$ is a pulse width modulation (PWM) switching control signal and is generated and output based on the input current detected by the input current detector.

The output current detector (E of FIG. 8) may detect output current flowing between the inverter 420 and the three-phase motor 250, that is, current flowing in the motor 250. The output current detector E may detect output currents $i_a$, $i_b$ and $i_c$ of respective phases or detect output currents of two phases using ternary phase equilibrium.

The output current detector E may be provided between the inverter 420 and the motor 250. For current detection, a current transformer (CT), a shunt resistor, etc. may be used.

When shunt resistors are used, three shunt resistors may be provided between the inverter 420 and the synchronization motor 250 or one end of each of the three shunt resistors may be connected to each of the three lower-arm switching elements, $S'_a$, $S'_b$ and $S'_c$ of the inverter 420. Alternatively, two shunt resistors may be used using ternary phase equilibrium. When one shunt resistor is used, the shunt resistor may be provided between the capacitor C and the inverter 420.

The detected output current is a discrete signal having a pulse shape and may be applied to the controller 430. Based on the detected output current, the inverter switching control signal $S_{ic}$ is generated. Hereinafter, assume that the detected output current is three-phase output currents $i_a$, $i_b$ and $i_c$.

The DC/DC converter 445 may be a bi-directional converter. That is, in the motor driving mode, the level of the DC voltage stored in the battery 205 is changed and the level-changed DC voltage is output to the inverter 420. In the charging mode, the level of the generated DC voltage may be changed and the level-changed DC voltage may be sent to the battery 205 by the switching operation of the inverter 420.

The DC/DC converter 445 may not be included in the driving unit 200.

The capacitor C for storing the DC voltage may be provided between the inverter 420 and the battery 205. The capacitor C may serve as a smoothing capacitor and the smoothing capacitor C may smooth the input voltage and store the smoothed voltage.

Although one smoothing capacitor C is shown in the figure, a plurality of capacitors may be included for stability.

In FIG. 3, the capacitor C is provided between the inverter 420 and the DC/DC converter 445.

Both ends of the capacitor C may be referred to as DC ends or DC link ends, because a DC voltage is stored.

The driving unit 200 may further include a DC end voltage detector for detecting the voltage between both ends of the capacitor C.

The DC end voltage detector may detect a DC end voltage $V_{dc}$ between both ends of the smoothing capacitor C. The DC end voltage detector B may include a resistor, an amplifier, etc. The detected DC end voltage $V_{dc}$ may be a discrete signal having a pulse shape and may be input to the controller 430.

When the DC/DC converter 445 is not provided between the inverter 420 and the battery 205, the DC end voltage $V_{dc}$ detected by the DC end voltage detector may correspond to the voltage $V_{BAT}$ of the battery 205.

The controller 430 may determine voltage boosting or voltage drop in the charging mode using the DC end voltage $V_{dc}$ and the input voltage corresponding to the voltage $V_{BAT}$ of the battery 205.

The switching unit 410, the inverter 420 and the controller 430 are included in the driving unit 200, that is, the charging apparatus 200, and may be located on the same circuit board. Such a charging apparatus may be referred to as an on board charger (OBC). The inverter, the controller and the switching unit of the charging apparatus are provided on the same circuit board, thereby implementing a small-size charging apparatus.

In addition to the switching unit 410, the inverter 420, and the controller 430, the DC/DC converter 445 may be included in the driving unit 200, that is, the charging apparatus 200, and may be located on the same circuit board.

Figure 4:
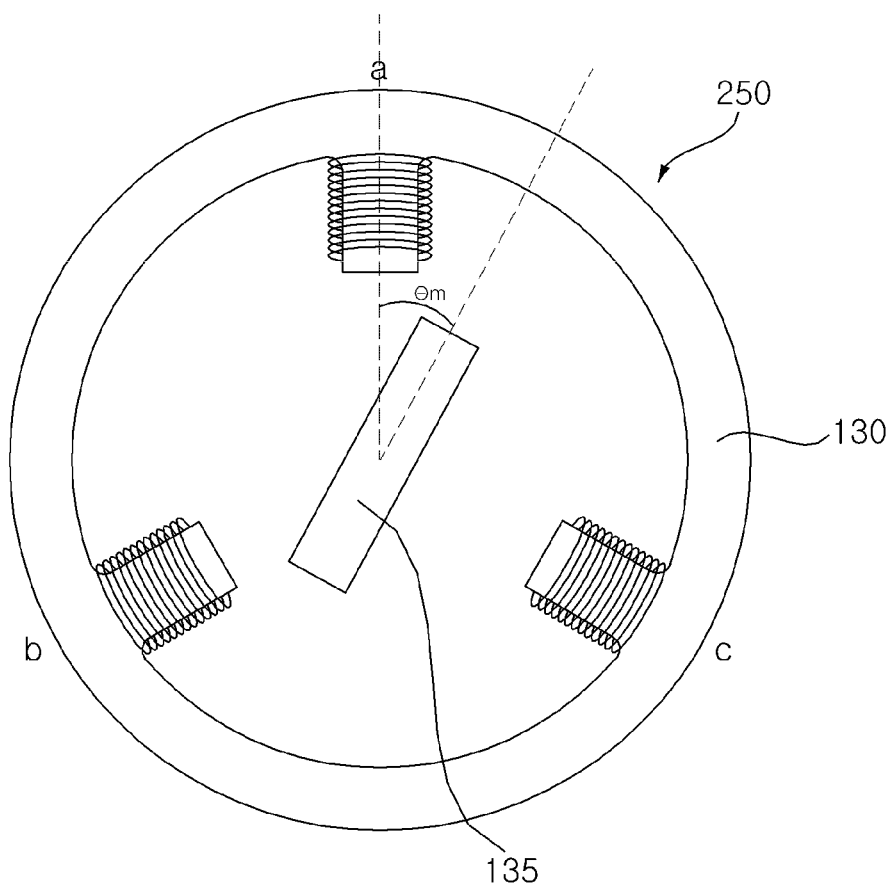
FIG. 4 is a diagram showing an example of the structure of a motor of FIG. 2.

FIG. 4 shows an example of the structure of the motor of FIG. 2.

Referring to FIG. 4, the motor 250 is a three-phase AC motor, in which PWM signals are input to coils wound on a stator of an a-phase, a b-phase and a c-phase. A rotator 135 rotates by an electric field and a magnetic field.

The motor structure of FIG. 4 is merely an example and other configurations may be used.

In the charging mode for charging the battery 205 with the input AC voltage, one-phase switching elements among the three-phase switching elements of the inverter operate. That is, the PWM signal is only applied to the coil wound on the stator of any one phase of the three phases of the motor 250.

For example, in the charging mode, as shown in FIG. 4, when the rotator 135 is located near the a-phase, the controller 430 may sense the location of the rotator and output the switching control signal $S_{ic}$ such that the rotator 135 is aligned with the a-phase. That is, the PWM signal is only applied to the coil wound on the stator of the a-phase among the three phases of the motor 250 such that the rotator 135 is aligned with the a-phase.

In FIG. 4, the a-phase stator is separated from the rotator 135 by a predetermined angle θk. The controller 430 estimates the location of the rotator based on a location signal H sensed by the locator sensor 235 of FIG. 8, estimates the location of the rotator based on the output current sensed by the output current detector E and controls the rotator 135 to be aligned with a closest phase of the three phases of the stator 130 of the motor.

In FIG. 4, since the rotator 135 is located near the a-phase, the rotator 135 is aligned with the a-phase stator. The controller 430 may control only the a-phase upper-arm and lower-arm switching elements $S_a$ and $S'_a$ among the total of three pairs of the upper-arm and lower-arm switching elements $S_a$, $S'_a$, $S_b$, $S'_b$, $S_c$ and $S'_c$ of the inverter 420.

Figure 8:
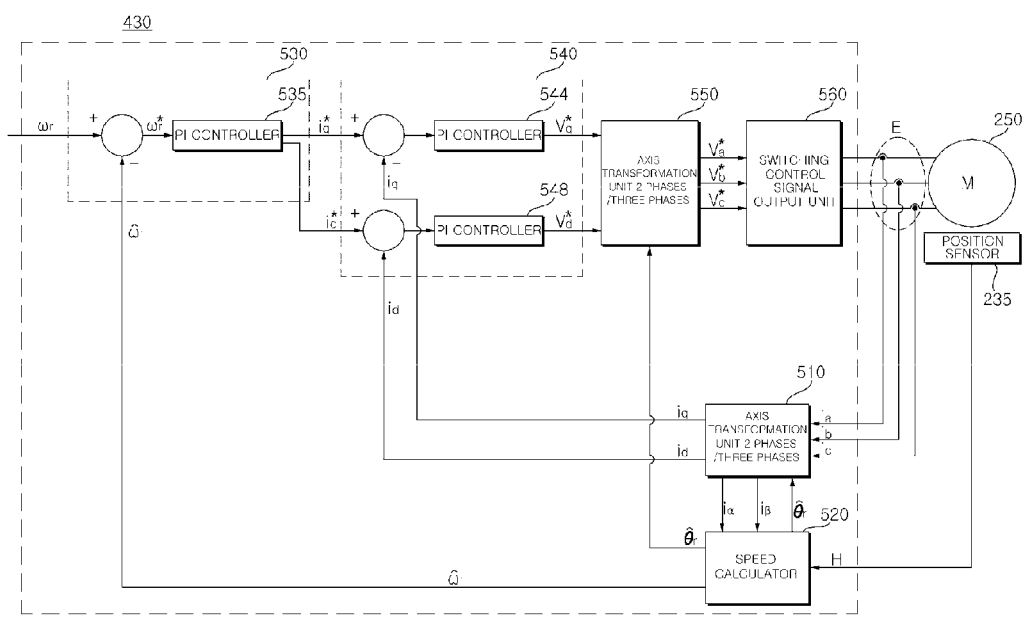
FIG. 8 is a block diagram showing an example of the internal configuration of a controller of FIG. 2.

Upon motor rotator alignment, a torque command component of a current command component may not be generated such that torque is not generated. Referring to FIG. 8, a current command generator 530 generates current command values $i^*_d$ and $i^*_q$. At this time, since the d-axis current command value $i^*_d$ is a flux current command value and the q-axis current command value $i^*_q$ is a torque current command value, the q-axis current command value $i^*_q$ is set to 0 such that torque is not generated upon motor alignment. Accordingly, in the charging mode, upon rotator alignment, torque is not generated, thereby minimizing motion of the electric vehicle.

Figure 5:
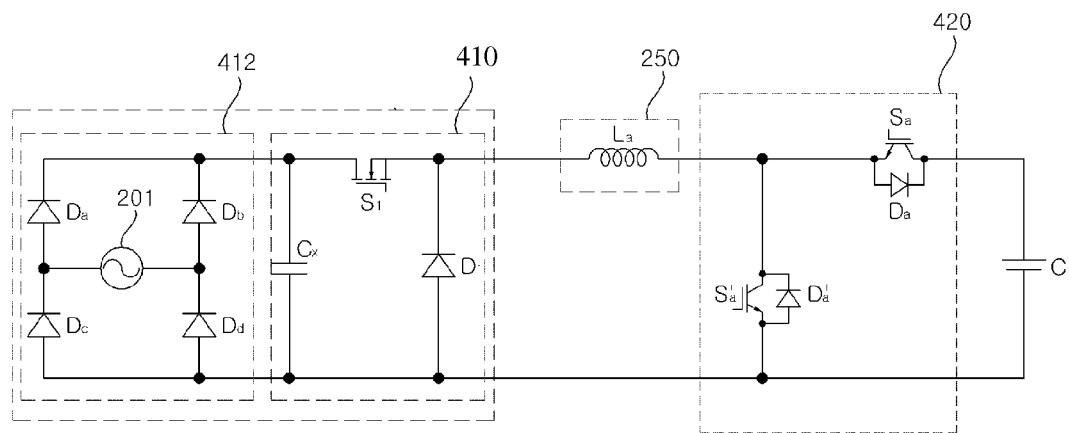
FIG. 5 is a diagram showing an example of an equivalent circuit of the driving unit of FIG. 2.

FIG. 5 shows an example of an equivalent circuit of the driving unit of FIG. 2.

Referring to FIG. 5, in the charging mode, when the rotator 135 is aligned with the a-phase stator, the motor 250 is expressed by the a-phase inductor $L_a$ and the inverter 420 is expressed by the a-phase switching elements $S_a$ and $S'_a$ in the circuit of the driving unit 200.

That is, the driving unit 200 may include the switching unit 410, the inductor $L_a$, the a-phase switching elements $S_a$ and $S'_a$ and the capacitor C.

The equivalent circuit of FIG. 5 may be referred to as a buck boost converter, because the switching unit 410, the inductor $L_a$, and the a-phase switching elements $S_a$ and $S'_a$ may operate in the boost mode as a boost converter and the switching unit 410, the inductor $L_a$, and the a-phase switching elements $S_a$ and $S'_a$ may operate in a buck mode as a buck converter.

Figure 6:
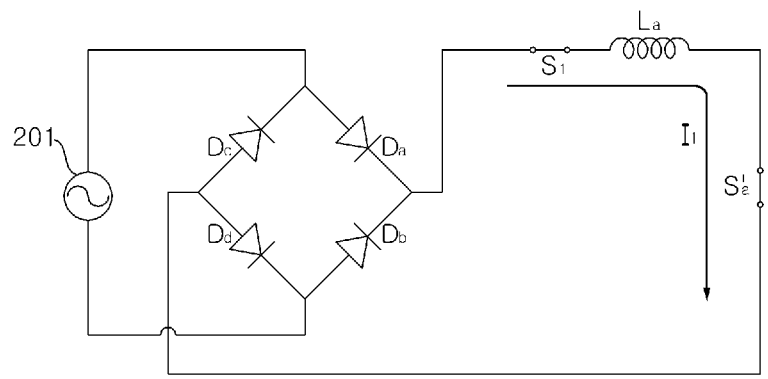
FIGS. 6 and 7 are views referred to for describing example operation of the circuit of FIG. 5.
Figure 6:
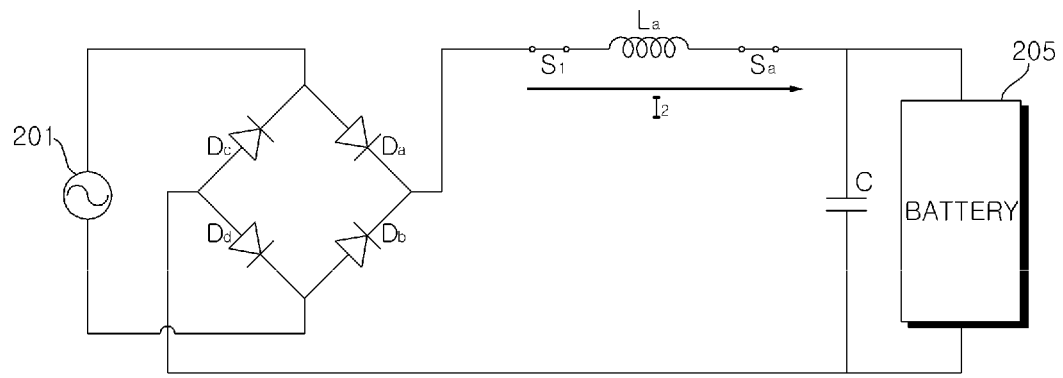
Figure 7:
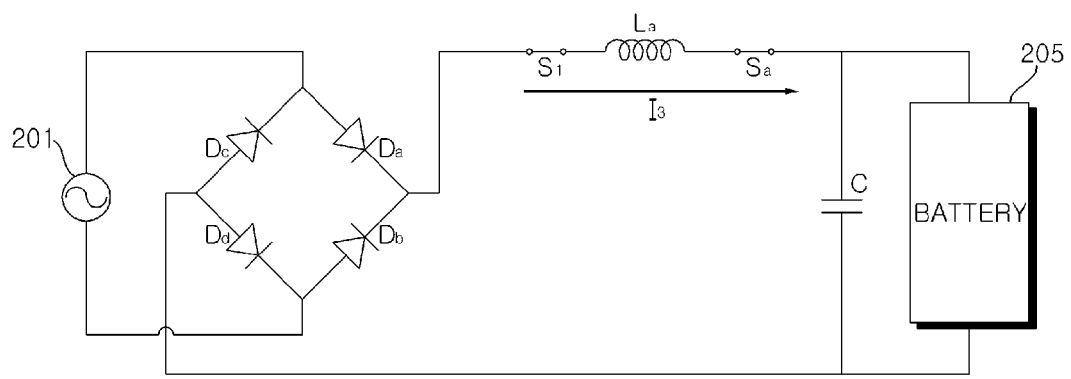
Figure 7:
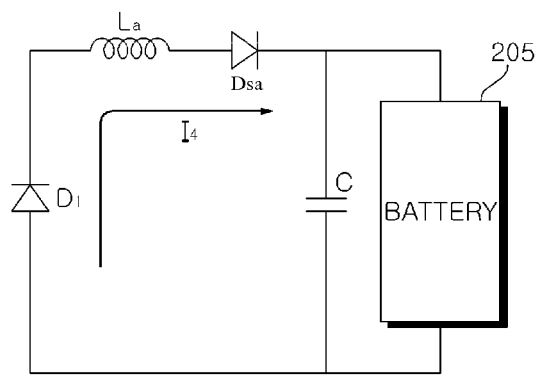

FIGS. 6 and 7 illustrate example operation of the circuit of FIG. 5.

First, FIG. 6 shows the case in which the equivalent circuit of the driving unit 200 of FIG. 5 operates in the boost mode.

FIG. 6(a) shows the case in which, when the switching element $S_1$ of the switching unit 410 and the a-phase lower-arm switching element $S'_a$ are turned on, a closed loop is formed by the switching element $S_1$ the a-phase inductor $L_a$, and the a-phase lower-arm switching element $S'_a$ such that current $I_1$ flows. Accordingly, energy is accumulated in the a-phase inductor $L_a$ based on current $I_1$. At this time, the a-phase upper-arm switching element $S_a$ is turned off.

FIG. 6(b) shows the case in which, when the switching element $S_1$ of the switching unit 410 and the a-phase upper-arm switching element $S_a$ are turned on, current $I_2$ flows through the a-phase upper-arm switching element $S_a$. By current $I_2$, the energy accumulated in the a-phase inductor $L_a$ in FIG. 6(a) is stored in the capacitor C and the battery 205. As a result, the boosted DC voltage is stored in the battery 205. At this time, the a-phase lower-arm switching element $S'_a$ is turned off.

That is, in the boost mode shown in FIG. 6, the switching element $S_1$ of the switching unit 410 is continuously turned on and the a-phase lower-arm switching element $S'_a$ is turned on/off, that is, operates in the PWM mode.

Next, FIG. 7 shows the case in which the equivalent circuit of the driving unit 200 of FIG. 5 operates in the buck mode.

FIG. 7(a) shows the case in which, when the switching element $S_1$ of the switching unit 410 and the a-phase upper-arm switching element $S_a$ are turned on, current $I_3$ flows through the switching element $S_1$ and the a-phase upper-arm switching element $S_a$. By current $I_3$, the DC voltage is stored in the capacitor C and the battery 205. Energy is accumulated in the a-phase inductor $L_a$ based on current $I_3$. At this time, the a-phase lower-arm switching element $S'_a$ is turned off.

FIG. 7(b) shows the case in which the switching element $S_1$ of the switching unit 410 and the a-phase lower-arm switching element $S'_a$ are turned off, current $I_4$ flows through the diode $D_1$, the a-phase inductor $L_a$ and the diode $D_{sa}$ connected to the a-phase upper-arm switching element $S_a$ in inverse parallel. In particular, energy is accumulated in the a-phase inductor $L_a$ based on current $I_4$. At this time, the a-phase upper-arm switching element $S_a$ is turned off.

That is, in the buck mode shown in FIG. 7, the switching element $S_1$ of the switching unit 410 is turned on/off, that is, operates in the PWM mode, and the a-phase lower-arm switching element $S'_a$ is continuously turned off.

The voltage boosting operation or the voltage drop operation of the driving unit 200, that is, the charging apparatus 200, may be determined by comparison between the voltage across the capacitor C and the voltage across the capacitor $C_x$ provided at the output end of the rectifier 412.

The controller 430 may control the switching elements $S_1$, $S_a$ and $S'_a$ so as to perform the voltage boosting operation as shown in FIG. 6 when the voltage across the capacitor $C_x$ is less than the voltage across the capacitor C.

The controller 430 may control the switching elements $S_1$, $S_a$ and $S'_a$ so as to perform the voltage drop operation as shown in FIG. 7 when the voltage across the capacitor $C_x$ is greater than the voltage across the capacitor C.

FIG. 8 shows an example of the internal configuration of the controller of FIG. 3.

Referring to FIG. 8, the controller 430 may include an axis transformation unit 510, a speed calculator 520, a current command generator 530, a voltage command generator 540, an axis transformation unit 550 and a switching control signal output unit 560.

The axis transformation unit 510 receives and transforms three-phase output currents $i_a$, $i_b$ and $i_c$ detected by the output current detector E into two-phase currents $i_\alpha$ and $i_\beta$ of a stationary reference frame.

The axis transformation unit 510 may transform two-phase currents $i_c$ and ip of the stationary reference frame into two-phase currents $i_d$ and $i_q$ of a rotating reference frame.

The speed calculator 520 may calculate a speed based on the location signal H of the rotator received from the position sensor 235. That is, the speed calculator may calculate the speed by dividing the movement distance of the rotator by the time based on the location signal of the rotator.

The position sensor 235 may sense the location of the rotator of the motor 250. The position sensor 235 may include a hall sensor.

The speed calculator 520 may output the calculated location $\hat{\theta}$, and the calculated speed $\hat{\omega}$, based on the received location signal H of the rotator.

The current command generator 530 calculates a speed command value $\omega^*_r$ based on the calculated speed $\hat{\omega}$ and a target speed $\omega_r$, and generates a current command value $i^*_q$ based on the speed command value $\omega^*_r$. For example, the current command generator 530 may perform PI control of the PI controller 535 based on the speed command value $\omega^*_r$, which is the difference between the calculated speed $\hat{\omega}_r$ and the target speed $\omega_r$, and generate the current command value $i^*_q$. Although the q-axis current command value $i^*_q$ is shown as the current command value in the figure, the d-axis current command value $i^*_d$ may also be generated. In addition, the value of the d-axis current command value $i^*_d$ may be set to 0.

The current command generator 530 may further include a limiter for limiting the level of the current command value $i^*_q$ such that the current command value $i^*_q$ does not exceed an allowable range.

Next, the voltage command generator 540 generates d-axis and q-axis voltage command values $v^*_d$ and $v^*_q$ based on d-axis and q-axis currents $i_d$ and $i_q$ transformed to the two-phase rotating reference frame by the axis transformation unit and the current command values $i^*_d$ and $i^*_q$ of the current command generator 530. For example, the voltage command generator 540 may perform PI control of the PI controller 544 and generate the q-axis voltage command value $v^*_q$, based on a difference between the q-axis current $i_q$ and the q-axis current command value $i^*_q$. In addition, the voltage command generator 540 may perform PI control of the PI controller 548 and generate the d-axis voltage command value $v^*_d$, based on a difference between the d-axis current $i_d$ and the d-axis current command value $i^*_d$. The d-axis voltage command value $v^*_d$ may be set to 0 when the d-axis current command value $i^*_d$ is set to 0.

The voltage command generator 540 may further include a limiter for limiting the level of the d-axis and q-axis voltage command values $v^*_d$ and $v^*_q$ such that the d-axis and q-axis voltage command values $v^*_d$ and $v^*_q$ do not exceed an allowable range.

The generated d-axis and q-axis voltage command values $v^*_d$ and $v^*_q$ are input to the axis transformation unit 550.

The axis transformation unit 550 receives the location $\hat{\theta}_r$ calculated by the speed calculator 520 and the d-axis and q-axis voltage command values $v^*_d$ and $v^*_q$ and performs axis transformation.

First, the axis transformation unit 550 transforms the two-phase rotating reference frame into the two-phase stationary reference frame. At this time, the location calculated by the speed calculator 520 may be used.

The axis transformation unit 550 transforms the two-phase stationary reference frame into the three-phase stationary reference frame. Through such transformation, the axis transformation unit 550 outputs three-phase voltage command values $v^*_a$, $v^*_b$ and $v^*_c$.

The switching control signal output unit 560 generates and outputs an inverter switching control signal $S_{ic}$, according to the pulse width modulation (PWM) method based on the three-phase output voltage command values $v^*_a$, $v^*_b$ and $v^*_c$.

The output inverter switching control signal $S_{ic}$ may be converted into a gate driving signal by a gate driving unit and may be input to the gates of the switching elements of the inverter 420. Thus, the switching elements $S_a$, $S'_a$ $S_b$, $S'_b$, $S_c$ and $S'_c$ of the inverter 420 perform the switching operation.

The controller 430 may control the switching operation of the switching element $S_1$ of the switching unit 410.

In some implementations, in the charging mode for charging the battery 205 with the input AC voltage, the two-phase switching elements among the three-phase switching elements of the inverter operate. That is, the PWM signal is applied to the coils wound on the stators of two phases among the three phases of the motor 250.

For example, in the charging mode, as shown in FIG. 4, when the rotator 135 is located between the a-phase stator and the c-phase stator, the controller 430 may sense the location of the rotator and output the switching control signal $S_{ic}$ such that the location of the rotator is maintained. That is, the PWM signals are applied to the coil wound on the stator of the a-phase and the coil wound on the stator of the c-phase among the three phases of the motor 250 such that the location of the rotator 135 is maintained.

In FIG. 4, the rotator 135 is located between the a-phase stator and the c-phase stator and is separated from the a-phase stator by a predetermined angle θk. The controller 430 estimates the location of the stator based on the location signal H sensed by the position sensor 235 of FIG. 8 or estimates the location of the rotator and maintains the rotator 135 at the estimated location based on the output current sensed by the output current detector E.

In FIG. 4, the rotator 135 is aligned between the a-phase stator and the c-phase stator. The controller 430 may control operation of only the a-phase upper-arm and lower-arm switching elements $S_a$ and $S'_a$ and the c-phase upper-arm and lower-arm switching elements $S_c$ and $S'_c$ of the total of the three pairs of switching elements $S_a$, $S'_a$, $S_b$, $S'_b$, $S_c$ and $S'_c$ of the inverter 420.

Upon motor rotator alignment, the torque command component of the current command component may not be generated such that torque is not generated. Referring to FIG. 8, the current command generator 530 generates current command values $i^*_d$ and $i^*_q$. At this time, since the d-axis current command value $i^*_d$ is a flux current command value and the q-axis current command value $i^*_q$ is a torque current command value, the q-axis current command value $i^*_q$ is set to 0 such that torque is not generated upon motor alignment. Accordingly, in the charging mode, upon rotator alignment, torque is not generated. Thus, the electric vehicle does not move.

Figure 9:
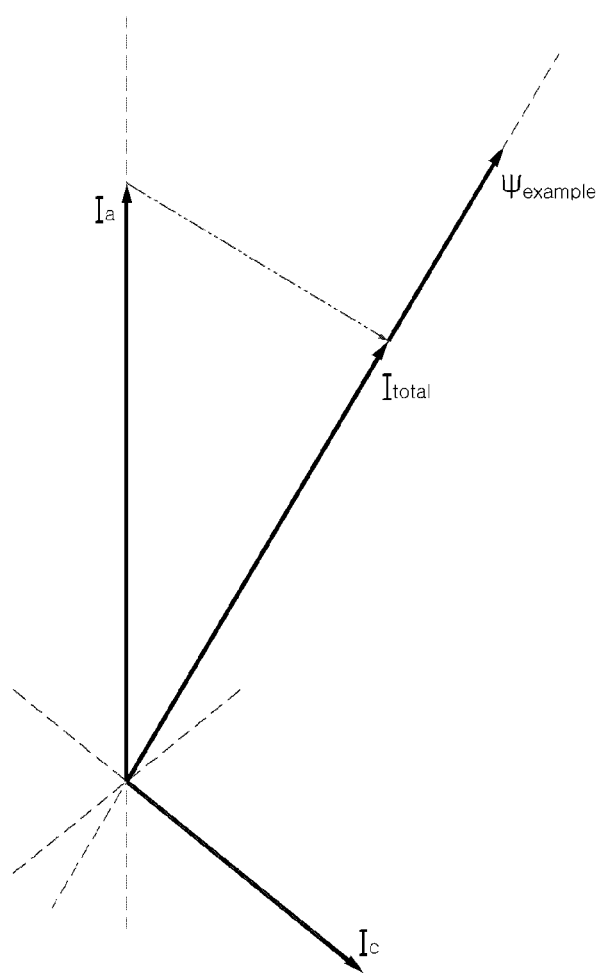
FIG. 9 is a diagram showing an example relationship between current vector components of two phases of a stator applied to a motor and a flux vector of a rotator.

FIG. 9 shows an example relationship between current vector components of two phases of a stator applied to a motor and a flux vector of a rotator.

Referring to FIG. 9, as shown in FIG. 4, in order to align the rotator 135 between the a-phase stator and the c-phase stator, a sum $I_{total}$ of the current vectors $I_a$ and $I_c$ of the two phases of the stators and the direction of a flux vector $\psi_{example}$ of the rotator may match. Further, the sum of the current vectors of the two phases of the stators and the flux vector of the rotator may match.

Thus, the torque component of the rotator is not generated and thus the electric vehicle does not move upon rotator alignment in the charging mode.

Figure 10:
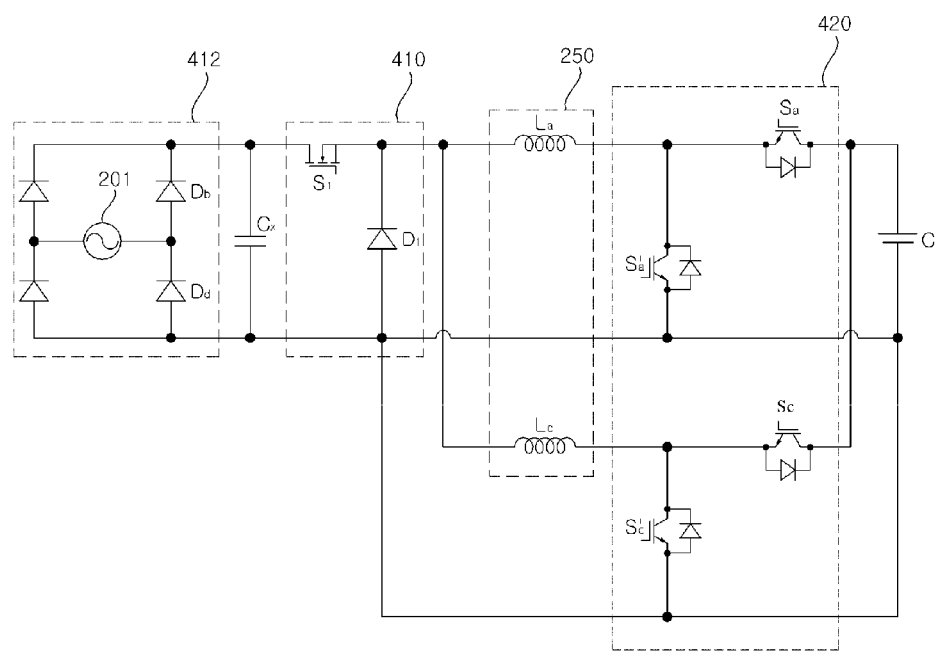
FIG. 10 is a diagram showing another example of an equivalent circuit of the driving unit of FIG. 2.

FIG. 10 shows another example of an equivalent circuit of the driving unit of FIG. 2.

Referring to FIG. 10, in the charging mode, when the rotator 135 is aligned between the a-phase stator and the c-phase stator, the motor 250 may be expressed by the a-phase inductor $L_a$ and the c-phase inductor $L_c$ and the inverter 420 may be expressed by the a-phase switching elements $S_a$ and $S'_a$ and the c-phase switching elements $S_c$ and $S'_c$ in the circuit of the driving unit 200.

That is, the driving unit 200 may include the switching unit 410, inductors $L_a$ and $L_c$, the a-phase switching elements $S_a$ and $S'_a$, the c-phase switching elements $S_c$ and $S'_c$ and the capacitor C.

At this time, the a-phase inductor $L_a$ and the c-phase inductor $L_c$ are connected in parallel and the a-phase switching elements $S_a$ and $S'_a$ and the c-phase switching elements $S_c$ and $S'_c$ are connected in parallel.

The equivalent circuit of FIG. 10 may be referred to as a buck boost converter, because the switching unit 410, the inductor $L_a$, and the a-phase switching elements $S_a$ and $S'_a$ may operate in the boost mode as a boost converter and the switching unit 410, the inductor $L_a$, and the a-phase switching elements $S_a$ and $S'_a$ may operate in a buck mode as a buck converter.

In addition, in the equivalent circuit of FIG. 10, the switching unit 410, the inductor $L_c$ and the c-phase switching elements $S_c$ and $S'_c$ may operate in the boost mode as a boost converter and the switching unit 410, the inductor $L_c$, and the c-phase switching elements $S_c$ and $S'_c$ may operate in a buck mode as a buck converter.

As a result, since the equivalent circuit of FIG. 10 may be referred to as an interleaved buck boost converter, because a plurality of buck boost converters are connected in parallel.

Although a cascade buck boost converter may perform an interleaving operation, since the rotator 135 is aligned between the a-phase stator and the c-phase stator, the interleaving operation may not be performed. For example, each buck boost converter may perform the same operation.

Hereinafter, the buck boost converter composed of the switching unit 410, the inductor $L_a$, and the a-phase switching elements $S_a$ and $S'_a$ will be focused upon.

Figure 11:
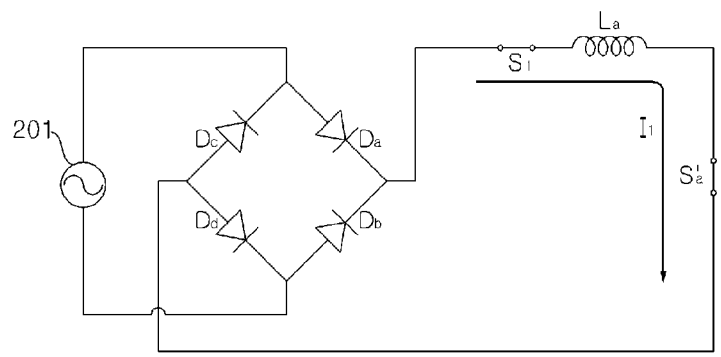
FIGS. 11 and 12 are views referred to for describing example operation of the circuit of FIG. 10.
Figure 11:
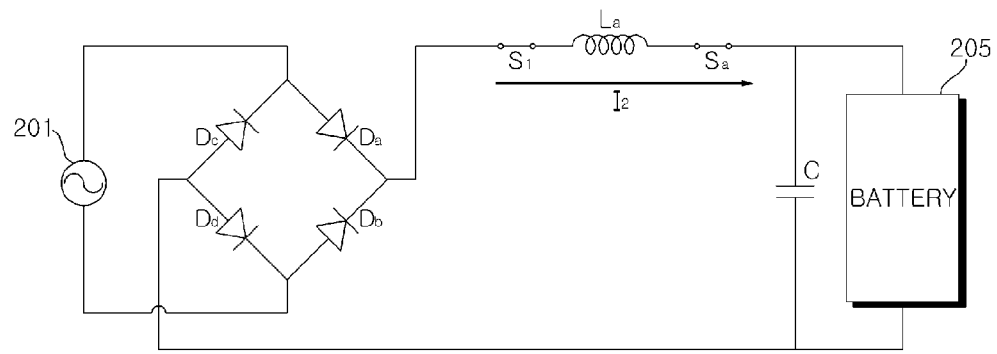
Figure 12:
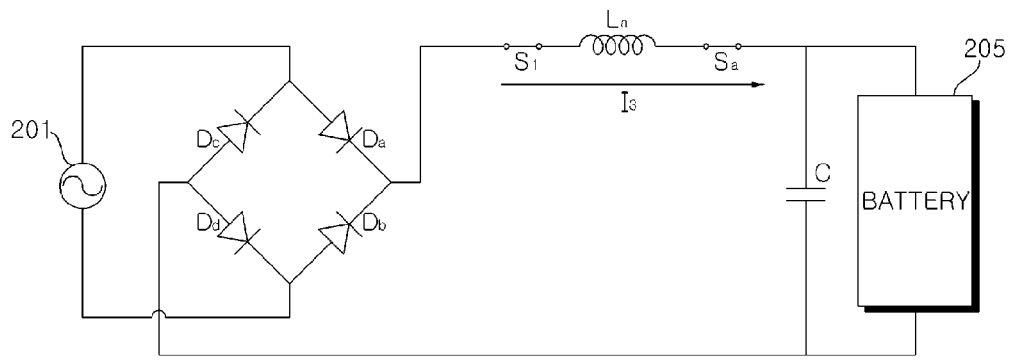
Figure 12:
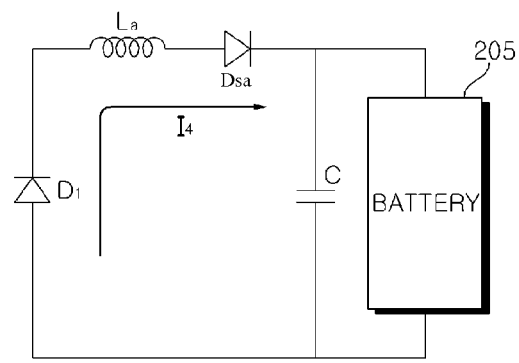

FIGS. 11 and 12 illustrate example operation of the circuit of FIG. 10.

First, FIG. 11 shows the case in which the equivalent circuit of the driving unit 200 of FIG. 10 operates in the boost mode.

FIG. 11(a) shows the case in which, when the switching element $S_1$ of the switching unit 410 and the a-phase lower-arm switching element $S'_a$ are turned on, a closed loop is formed by the switching element $S_{ic}$ the a-phase inductor $L_a$, and the a-phase lower-arm switching element $S'_a$ such that current $I_1$ flows. Accordingly, energy is accumulated in the a-phase inductor $L_a$ based on current $I_1$. At this time, the a-phase upper-arm switching element $S_a$ is turned off.

FIG. 11(b) shows the case in which, when the switching element $S_1$ of the switching unit 410 and the a-phase upper-arm switching element $S_a$ are turned on, current flows through the a-phase upper-arm switching element $S_a$. By current $I_2$, the energy accumulated in the a-phase inductor $L_a$ in FIG. 11(a) is stored in the capacitor C and the battery 205. As a result, the boosted DC voltage is stored in the battery 205. At this time, the a-phase lower-arm switching element $S'_a$ is turned off.

That is, in the boost mode shown in FIG. 11, the switching element $S_1$ of the switching unit 410 is continuously turned on and the a-phase lower-arm switching element $S'_a$ is turned on/off, that is, operates in the PWM mode.

Next, FIG. 12 shows the case in which the equivalent circuit of the driving unit 200 of FIG. 10 operates in the buck mode.

FIG. 12(a) shows the case in which, when the switching element $S_1$ of the switching unit 410 and the a-phase upper-arm switching element $S_a$ are turned on, current $I_3$ flows through the switching element $S_1$ and the a-phase upper-arm switching element $S_a$. By current $I_3$, the DC voltage is stored in the capacitor C and the battery 205. Energy is accumulated in the a-phase inductor $L_a$ based on current $I_3$. At this time, the a-phase lower-arm switching element $S'_a$ is turned off.

FIG. 12(b) shows the case in which the switching element $S_1$ of the switching unit 410 and the a-phase lower-arm switching element $S'_a$ are turned off, current $I_4$ flows through the diode $D_1$, the a-phase inductor $L_a$ and the diode $D_{sa}$ connected to the a-phase upper-arm switching element $S_a$ in inverse parallel. In particular, energy is accumulated in the a-phase inductor $L_a$ based on current $I_1$. At this time, the a-phase upper-arm switching element $S_a$ is turned off.

That is, in the buck mode shown in FIG. 12, the switching element $S_1$ of the switching unit 410 is turned on/off, that is, operates in the PWM mode, and the a-phase lower-arm switching element $S'_a$ is continuously turned off.

The voltage boosting operation or the voltage drop operation of the driving unit 200, that is, the charging apparatus 200, may be determined by comparison between the voltage across the capacitor C and the voltage across the capacitor $C_x$ provided at the output end of the rectifier 412.

The controller 430 may control the switching elements $S_1$, $S_a$ and $S'_a$ so as to perform the voltage boosting operation as shown in FIG. 11 when the voltage across the capacitor $C_x$ is less than the voltage across the capacitor C.

The controller 430 may control the switching elements $S_1$, $S_a$ and $S'_a$ so as to perform the voltage drop operation as shown in FIG. 12 when the voltage across the capacitor $C_x$ is greater than the voltage across the capacitor C.

The charging apparatus and the electric vehicle including the same described throughout this disclosure are not restricted to the examples set forth herein. Therefore, variations and combinations of the examples set forth herein fall within the scope of the present disclosure.

In some implementations, in the charging apparatus and the electric vehicle including the same, in the charging mode, the switching elements of one phase of three-phase switching elements of the inverter operate to convert the input AC voltage into the DC voltage through the switching unit, the motor and the inverter and to supply the DC voltage to the battery. Accordingly, it may be possible to perform charging using the AC voltage.

In particular, the converter may include the switching unit, the motor and the inverter. The switching unit, the motor, and the inverter may operate as a boost converter and the switching unit, the motor, and the inverter may operate as a buck converter by operation of the switching elements of one phase of the three-phase switching elements of the inverter. As a result, the charging apparatus may operate as a buck boost converter. Therefore, the converter may adaptively perform a voltage boosting operation or a voltage drop operation according to the battery charging voltage.

Since the charging apparatus uses the motor and the inverter, the buck boost converter may operate using only the switching unit. Therefore, it may be possible to reduce costs.

In addition, since a capacitor having a high rated voltage is not used between the switching unit serving as the buck converter and the motor serving as the boost converter, it may be possible to reduce costs.

Upon initial charging, since the switching elements of one phase of the three-phase switching elements of the inverter operate after the location of the rotator of the motor is determined, it may be possible to minimize movement of the rotator of the motor in the charging mode.

Since the inverter, the controller and the switching unit of the charging apparatus may be implemented on the same circuit board, it may be possible to implement a small-size charging apparatus.

In some examples, in the charging apparatus and the electric vehicle including the same, in the charging mode, the switching elements of two phases of three-phase switching elements of the inverter operate to convert the input AC voltage into the DC voltage through the switching unit, the motor, and the inverter and to supply the DC voltage to the battery. Accordingly, it may be possible to easily perform charging using the AC voltage.

In particular, the converter may include the switching unit, the motor and the inverter. The switching unit, the motor, and the inverter may operate as a boost converter and the switching unit, the motor, and the inverter may operate as a buck converter by operation of the switching elements of two phases of the three-phase switching elements of the inverter. As a result, the charging apparatus may operate as a buck boost converter. Therefore, the converter may adaptively perform a voltage boosting operation or a voltage drop operation according to the battery charging voltage.

Upon initial charging, since the switching elements of two phases of the three-phase switching elements of the inverter operate after the location of the rotator of the motor is determined, it may be possible to perform charging in a state of stopping the rotator of the motor in the charging mode.

The method for operating the charging apparatus may be implemented as code that is written to a processor-readable recording medium included in the charging apparatus and may thus be read by a processor. The processor-readable recording medium may be any type of recording device in which data can be stored in a processor-readable manner.

Although examples have been disclosed for illustrative purposes, those skilled in the art will appreciate that various modifications, additions and substitutions are possible, without departing from the scope and spirit of the disclosure and the accompanying claims.

What is claimed is:

1. A charging apparatus comprising:
    a converter configured to, in a charging mode, receive an input alternating current (AC) voltage and convert the input AC voltage into an output direct current (DC) voltage; and
    a controller configured to control the converter,
    wherein the converter includes:
        a motor;
        a switching unit configured to selectively supply the input AC voltage to the motor by performing a switching operation; and
        an inverter configured to, in a motor operation mode, convert a battery DC voltage from a battery into an output AC voltage by performing a switching operation of three-phase switching elements and drive the motor, and, in the charging mode, operate switching elements of at least one phase of the three-phase switching elements and convert a voltage received from the motor into a predetermined DC voltage and supply the predetermined DC voltage to the battery.

2. The charging apparatus according to claim 1, wherein, in the charging mode, a switching element of the switching unit, the motor, and the switching elements of one phase of the inverter operate in a buck mode or a boost mode.

3. The charging apparatus according to claim 1, wherein, in the charging mode:
    when a lower-arm switching element of the switching elements of one phase of the inverter is turned on and then turned off in a state in which a switching element of the switching unit is turned on, the switching element of the switching unit, the motor, and the switching elements of one phase of the inverter operate in a boost mode, and
    when the switching element of the switching unit is turned on and then turned off in a state in which the lower-arm switching element of the switching elements of one phase of the inverter is turned off, the switching element of the switching unit, the motor, and the switching elements of one phase of the inverter operate in a buck mode.

4. The charging apparatus according to claim 1, wherein the inverter, the controller, and the switching unit are located on a same circuit board.

5. The charging apparatus according to claim 1, wherein the controller is configured to, in the charging mode, control the switching elements of one phase of the three-phase switching elements of the inverter such that a rotator of the motor is aligned with a predetermined location, and control output of a switching control signal to the switching elements of one phase of the three-phase switching elements of the inverter such that a torque command component of a current command component is zero.

6. The charging apparatus according to claim 5, wherein the controller is configured to, in the charging mode, sense the location of the rotator of the motor and control the switching elements of a nearest phase of the three-phase switching elements of the inverter such that the rotator is located in correspondence with the nearest phase of the three phases of a stator of the motor.

7. The charging apparatus according to claim 1, wherein the controller includes:
    a speed calculator configured to calculate rotator speed information of the motor based on a location signal of a rotator of the motor or a detected current flowing in the motor;
    a current command generator configured to generate a current command value based on the rotator speed information and a speed command value;
    a voltage command generator for generating a voltage command value based on the current command value and the detected current; and
    a switching control signal output unit configured to output a switching control signal that drives the inverter based on the voltage command value.

8. The charging apparatus according to claim 1, wherein, in the charging mode, a switching element of the switching unit, the motor, and the switching elements of two phases of the inverter operate in a buck mode or a boost mode.

9. The charging apparatus according to claim 1, wherein, in the charging mode:
    when a lower-arm switching element of the switching elements of two phases of the inverter is turned on and then turned off in a state in which a switching element of the switching unit is turned on, the switching element of the switching unit, the motor, and the switching elements of two phases of the inverter operate in a boost mode, and
    when the switching element of the switching unit is turned on and then turned off in a state in which the lower-arm switching element of the switching elements of two phases of the inverter is turned off, the switching element of the switching unit, the motor, and the switching elements of two phases of the inverter operate in a buck mode.

10. The charging apparatus according to claim 1, wherein the controller is configured to, in the charging mode, control the operation of the switching elements of two phases of the three-phase switching elements of the inverter in correspondence with a location of a rotator of the motor.

11. The charging apparatus according to claim 1, wherein the controller is configured to, in the charging mode, control the switching elements of two phases of the three-phase switching elements of the inverter such that a rotator of the motor is aligned with a predetermined location and control output of a switching control signal to the switching elements of two phases of the three-phase switching elements of the inverter such that a torque command component of a current command component is zero.

12. The charging apparatus according to claim 1, wherein the controller is configured to, in the charging mode, sense a location of a rotator of the motor and control the switching elements of two phases of the three-phase switching elements of the inverter such that the location of the rotator is maintained.

13. The charging apparatus according to claim 1, wherein the controller is configured to, in the charging mode, control the switching elements of two phases of the three-phase switching elements of the inverter such that a rotator of the motor is aligned with a predetermined location and control matching of a sum of current vectors applied to two phases of a stator of the motor and a direction of a flux vector of the rotator of the motor.

14. An electric vehicle comprising:
a battery; and
a charging apparatus including a converter configured to, in a charging mode, receive an input alternating current (AC) voltage and convert the input AC voltage into a direct current (DC) voltage and a controller configured to control the converter,
wherein the converter includes:
a motor;
a switching unit configured to selectively supply the input AC voltage to the motor by performing a switching operation; and
an inverter configured to, in a motor operation mode, convert a battery DC voltage from a battery into an output AC voltage by performing a switching operation of three-phase switching elements and drive the motor, and, in the charging mode, operate switching elements of at least one phase of the three-phase switching elements and convert a voltage received from the motor into a predetermined DC voltage and supply the predetermined DC voltage to the battery.

15. The electric vehicle according to claim 14, wherein, in the charging mode:
when a lower-arm switching element of the switching elements of one phase of the inverter is turned on and then turned off in a state in which a switching element of the switching unit is turned on, the switching element of the switching unit, the motor, and the switching elements of one phase of the inverter operate in a boost mode, and
when the switching element of the switching unit is turned on and then turned off in a state in which the lower-arm switching element of the switching elements of one phase of the inverter is turned off, the switching element of the switching unit, the motor, and the switching elements of one phase of the inverter operate in a buck mode.

16. The electric vehicle according to claim 14, wherein the controller is configured to, in the charging mode, control the switching elements of one phase of the three-phase switching elements of the inverter such that a rotator of the motor is aligned with a predetermined location and control output of a switching control signal to the switching elements of one phase of the three-phase switching elements of the inverter such that a torque command component of a current command component is zero.

17. The electric vehicle according to claim 14, wherein, in the charging mode:
when a lower-arm switching element of the switching elements of two phases of the inverter is turned on and then turned off in a state in which a switching element of the switching unit is turned on, the switching element of the switching unit, the motor, and the switching elements of two phases of the inverter operate in a boost mode, and
when the switching element of the switching unit is turned on and then turned off in a state in which the lower-arm switching element of the switching elements of two phases of the inverter is turned off, the switching element of the switching unit, the motor, and the switching elements of two phases of the inverter operate in a buck mode.

18. The electric vehicle according to claim 14, wherein the controller is configured to, in the charging mode, control the switching elements of two phases of the three-phase switching elements of the inverter such that a rotator of the motor is aligned with a predetermined location and control output of a switching control signal to the switching elements of two phases of the three-phase switching elements of the inverter such that a torque command component of a current command component is zero.

19. The electric vehicle according to claim 14, wherein the controller is configured to, in the charging mode, sense a location of a rotator of the motor and control the switching elements of two phases of the three-phase switching elements of the inverter such that the location of the rotator is maintained.

20. The electric vehicle according to claim 14, wherein the controller is configured to, in the charging mode, control the switching elements of two phases of the three-phase switching elements of the inverter such that a rotator of the motor is aligned with a predetermined location and control matching of a sum of current vectors applied to two phases of a stator of the motor and a direction of a flux vector of the rotator of the motor.

* * * * *